United States Patent [19]
Prillig et al.

[11] 3,880,116
[45] Apr. 29, 1975

[54] PARTICLE COATING APPARATUS
[75] Inventors: Elliott B. Prillig, Schaumburg; Libero A. Gardella, Wildwood; Albert R. Knuth, Mt. Prospect, all of Ill.
[73] Assignee: Arnar-Stone Laboratories, Inc., Mt. Prospect, Ill.
[22] Filed: Feb. 14, 1974
[21] Appl. No.: 442,669

[52] U.S. Cl. ............... 118/303; 118/19; 118/24; 118/62
[51] Int. Cl. ............................................ B05b 17/00
[58] Field of Search ............ 118/19, 24, 62, 303, 25

[56] References Cited
UNITED STATES PATENTS

| | | | |
|---|---|---|---|
| 2,799,241 | 7/1967 | Wurster | 118/19 |
| 3,110,626 | 11/1963 | Larson et al. | 118/24 |
| 3,112,220 | 11/1963 | Heiser et al. | 118/24 |
| 3,237,596 | 3/1966 | Grass et al. | 118/303 |
| 3,241,520 | 3/1966 | Wurster et al. | 118/62 |
| 3,253,944 | 5/1966 | Wurster | 118/62 |
| 3,354,863 | 11/1967 | Reynolds | 118/62 |
| 3,385,724 | 5/1968 | Grün | 118/303 |
| 3,386,182 | 6/1968 | Lippert | 118/303 |
| 3,411,480 | 11/1968 | Grass et al. | 118/24 |
| 3,437,073 | 4/1969 | Drake et al. | 118/24 |

Primary Examiner—Mervin Stein
Assistant Examiner—Douglas A. Salser
Attorney, Agent, or Firm—Dawson, Tilton, Fallon & Lungmus

[57] ABSTRACT

An apparatus for coating tablets and other particles with liquid coating materials while such particles are suspended and circulated in an air-fluidized bed. The apparatus includes an upstanding casing with a cylindrical upper section and a tapered lower section. A plenum chamber is provided about the tapered lowered section for directing pressurized air into an inlet at the bottom of the casing. The inlet is completely open and unobstructed so that when the flow of pressurized air is discontinued particles within the casing will fall downwardly through the inlet into the plenum to be emptied therefrom. A spray nozzle is mounted in the plenum in coaxial alignment with the inlet for spraying liquid upwardly into the casing to coat the suspended particles circulating therein. Means are disclosed for promoting smooth and efficient air flow, for permitting interchange of nozzles without discontinuing the suspension and circulation of particles, and for viewing and thereby controlling the coating operation as it is being performed.

22 Claims, 3 Drawing Figures

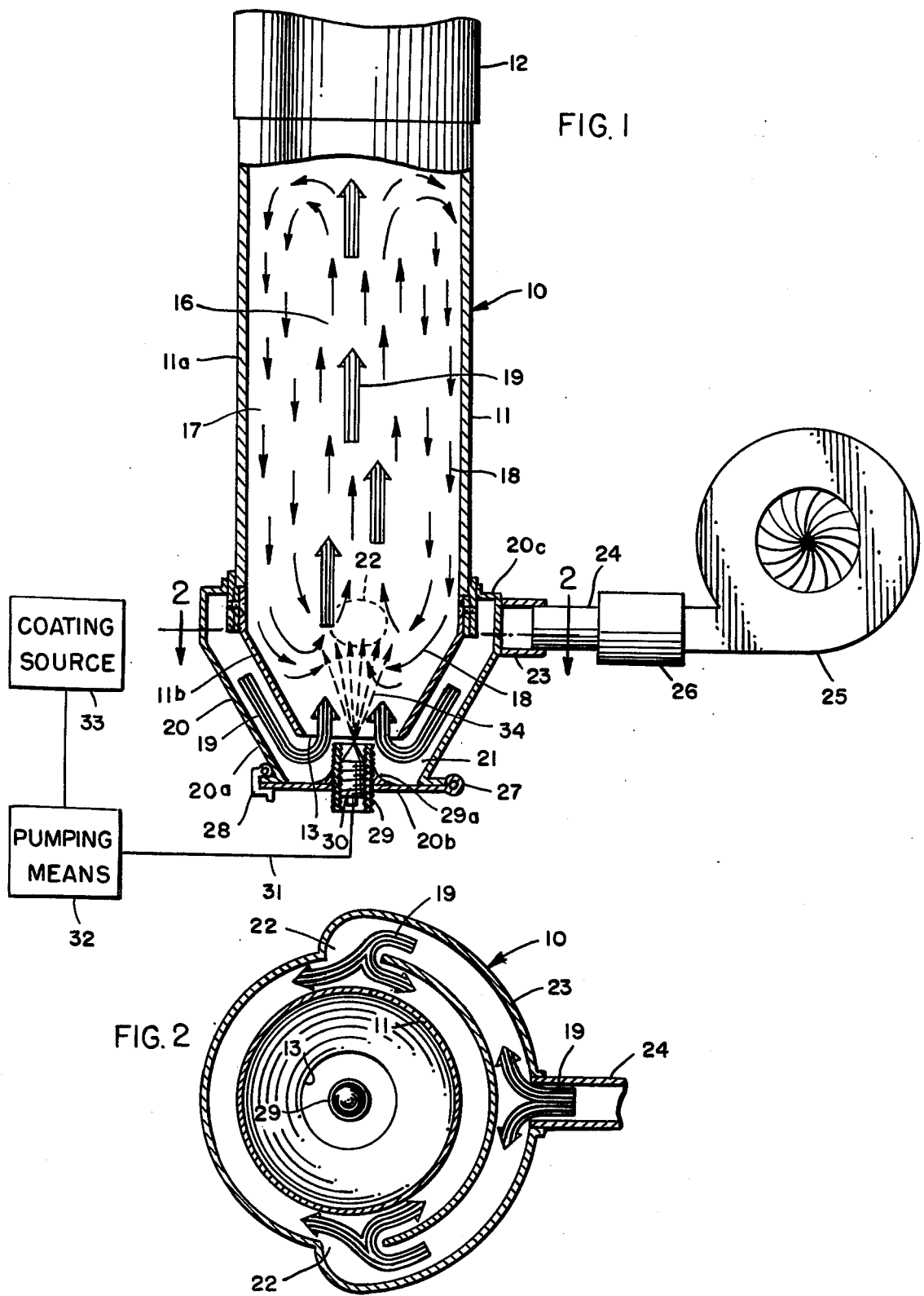

PARTICLE COATING APPARATUS

BACKGROUND

The so-called "air-suspension" method of coating tablets and other particles is well known, having been disclosed in considerable detail in U.S. Pat. Nos. 2,648,609, 2,799,241, 3,089,824, 3,117,027, 3,112,220, 3,207,824, 3,196,827, 3,253,944, 3,241,520, and 3,437,073. Commercial equipment utilizing that method commonly consists of an outer cylindrical casing having a tapered lower section terminating in an air inlet opening. A screen or other porous member extends across the inlet to retain particles in the casing when the flow pressurized air is discontinued. At or above the center of the screen is an upwardly-facing nozzle for spraying liquid coating materials upwardly into the central zone of the casing. As the air-suspended particles commence their upward travel within the central zone of the casing they are coated with the coating liquid discharged from the nozzle. The atomized liquid deposited on the particles dries as such particles migrate upwardly within the central zone and as they travel downwardly through the annular outer zone of the casing. Since the particles are recirculated within the apparatus, successive layers of coating material are applied to the particles until a coating of the desired thickness has been formed.

Smoothness of operation has been improved by utilizing a partition within the casing to separate the inner and outer zones. Co-pending co-owned application Ser. No. 401,157, filed Sept. 27, 1973, discloses a construction having a tubular inner shell with walls that slope downwardly and outwardly, thereby providing a unit having flow characteristics particularly suitable for the coating of relatively small particles without encountering jamming and clogging problems.

While the screen extending across the bottom of a conventional coating apparatus does serve as an effective means for retaining particles in the casing, such a construction has a number of significant drawbacks. For example, if a screen is to block the passage of particles, then obviously the interstices of the screen must be smaller than the particles to be coated. The screen therefore restricts the upward flow of air, especially in an apparatus set up for the coating of particles in the smaller size ranges, and also tends to distort the spray pattern for the coating fluid. In screen-equipped units, it is apparent that the spray nozzle cannot be located below the screen, since the screen would become quickly coated and clogged with coating fluid, and, consequently, the spray nozzle is commonly located in the air stream above such a screen. To the air turbulence caused by the screen is added the turbulence created by the physical presence of the nozzle structure, the combined effect being distortion of the spray pattern which not only reduces the effectiveness of the apparatus as a whole but which also commonly causes eddy currents to impinge on the screen and ultimately coat and clog the screen.

Since the nozzle and tubing supplying coating liquid to the nozzle of a conventional screen-equipped coating apparatus is normally located in the air stream above the screen, another problem frequently arises — that of flash evaporation of the coating liquid. The nozzle and tubing are exposed to the upward flow of heated air with the result that the nozzle and the liquid passing through it are heated prior to atomization. Should the spray liquid be heated sufficiently to flash evaporate, the particles will remain uncoated, or be improperly or insufficiently coated, because of drying of the coating liquid prior to application. While such inefficiencies might be tolerated in the operation of an apparatus in which the coating liquid is relatively inexpensive, they are clearly unacceptable in a system where critical amounts of a costly or scarce coating composition, such as a coating containing a drug product, are to be applied.

SUMMARY

One aspect of this invention lies in the discovery that by forming a plenum chamber about the tapered lower end portion of the casing of a coating apparatus and by reorienting and shielding the nozzle and tubing supplying the liquid to the nozzle, the screen customarily used in such an apparatus may be eliminated and the defects and disadvantages described above may be avoided. The result is an apparatus which performs more efficiently, is relatively free of clogging and cleaning problems, is readily adjustable during operation, and is relatively simple to empty following a coating operation. Where interchange of nozzles is required during a coating operation, as where successive layers of different coating materials having different characteristics arc to be applied, such interchange may take place without interruping the circulation of particles through the casing of the apparatus.

The apparatus includes an upstanding casing having a generally cyindrical upper section and a downwardly tapered frusto-conical lower section terminating in an air inlet. A second casing extends about the lower section of the first casing and defines (along with the outer lower surface of the first casing) a plenum chamber leading downwardly and inwardly from at least one elevated air entry port to the lower inlet opening for the main or first casing. Preferably a plurality of such air entry ports are provided for introducing pressurized air from a suitable source into the plenum.

The second casing also includes a tubular wall or collar disposed within the plenum and spaced directly below the inlet of the first casing. The spray nozzle is removably mounted within the collar which is adjustably mounted below the first casing. Air flowing through the plenum must change directions sharply to pass upwardly through the inlet, the collar serving as a baffle to redirect the flow of air and, at the same time, to protect the nozzle and tubing supplying liquid to the nozzle against direct exposure to the heated air.

The second casing is provided with a bottom wall spaced a substantial distance below the inlet of the first casing. The bottom wall is hingedly or movably mounted so that when a coating operation is discontinued and the coated particles have fallen downwardly into the plenum, which serves as a collecting chamber, the bottom wall of that chamber may be opened to empty the batch of coated particles from the apparatus. In the best mode presently known for practicing the invention, the bottom wall is formed of transparent material so that during a coating process an operator may inspect, and if necessary adjust, spray formation and application, and particle condition and circulation.

Other objects, advantages, and features of the invention will become apparent as the specification proceeds.

DRAWINGS

FIG. 1 is a somewhat diagrammatic side elevational view, taken partly in section, showing an apparatus embodying this invention.

FIG. 2 is a horizontal sectional view taken along line 2—2 of FIG. 1.

DESCRIPTION

Figure 3:
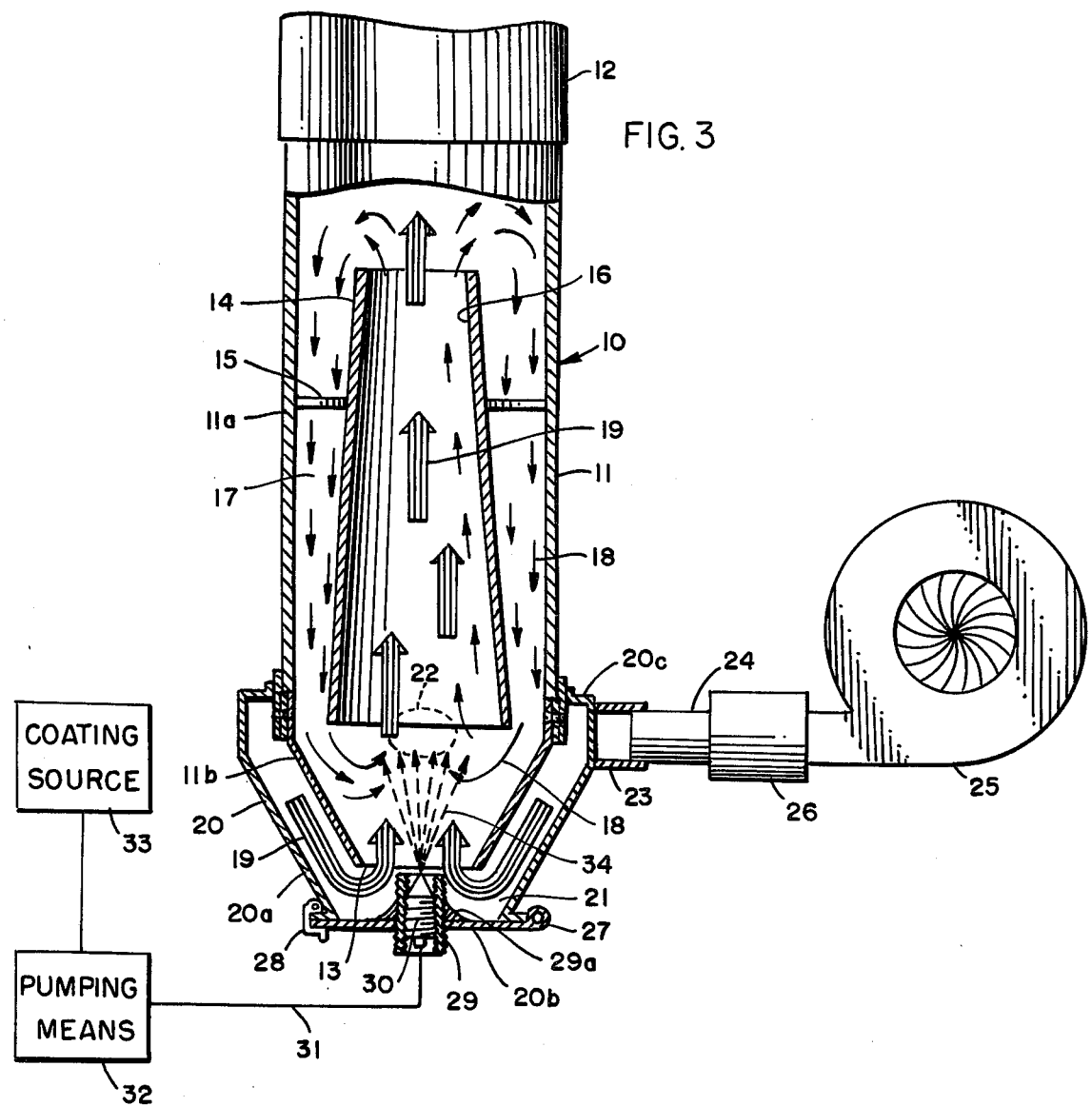
FIG. 3 is a somewhat diagrammatic side elevational view, taken partly in section, showing modified apparatus embodying this invention with a center partition.

Referring to FIGS. 1–2, the numeral 10 generally designates a particle coating apparatus having an upstanding first casing 11, the casing having a cylindrical main body section 11a and an inwardly and downwardly tapering frustoconical lower section 11b. The open upper end of the casing is connected to an exhaust duct 12 and the tapered lower end of the casing is provided with a reduced air inlet opening 13. It will be noted that the inlet is completely open and, specifically, that no screen or other porous member extends across the inlet.

In the operation of the apparatus, particles circulate as indicated by the smaller arrows 18 in FIG. 1. Specifically, the particles migrate upwardly, suspended and lifted by upwardly flowing air indicated by larger arrows 19. The particles travel upwardly through the central zone or passage 16 and, upon reaching the top of the bed of particles, pass outwardly and downwardly in fountain-like manner. Such particles then travel downwardly under the influence of gravity through the annular outer zone or passage 17, finally passing once again into the lower casing section 11b.

About the tapered lower section 11b of the first casing is a second casing 20. The second casing includes a downwardly and inwardly tapered side wall 20a of frustoconical configuration and a transverse bottom wall 20b spaced a substantial distance beneath inlet 13 of the first or main casing 11. A top wall 20c of the second casing is sealed to the body of the main casing. In the illustration given, the generally sloping side wall 20a is provided at its upper end with a cylindrical portion which merges with top wall 20c, the several wall portions, together with the frusto-conical wall of lower main casing section 11b, defining a plenum chamber 21.

Air enters the upper portion of plenum 21 through one or more air entry ports 22 (FIG. 2). A plurality of such ports is believed particularly desirable to insure an even, uniform, and controlled flow of air from the plenum through inlet 13 of main casing 11. In the form shown in the drawings, a pair of diametrically disposed air inlet ports are provided; however, it is to be understood that a greater number may be provided if desired. A C-shaped distributor 23 conveys air from supply passage 24 leading from blower 25. Means for controlling the humidity and temperature are diagrammatically illustrated and designated generally by numeral 26, it being understood that such means are entirely conventional and that further description is unnecessary for purposes of disclosing the present invention. Reference may be had to the aforementioned prior patents for further information concerning such means and also concerning power-operated blower 25.

Bottom wall 20b is formed from a transparent material such as glass or plastic and is mounted to provide a removable (or movable) closure for the plenum 21. In the embodiment illustrated in the drawings, wall 20b is attached to side wall 20a by means of hinge 27 and diametrically disposed latch 28, or other suitable removable connection. Within the plenum is a movable inner wall or collar 29 which projects upwardly from bottom wall 20b and which is coaxial with inlet 13 and casing 11. Vertical adjustability of the collar is achieved by threadedly connecting it to bottom wall 20b (through which it extends) although it is to be understood that other means for adjustably supporting the collar within the plenum, to allow for adjustment of the top of the collar relative to the inlet 13, might be used. The outside dimensions of the collar are substantially smaller than the corresponding dimensions of inlet 13. Within the vertical collar is a nozzle 30 which is removably retained within the collar by threads or by any other suitable means. In normal operation, the tip of the nozzle 30 is disposed below the upper limits of collar 29, and, in any event, does not extend an appreciable distance above the collar. As a result, hot air passing downwardly through the plenum and then upwardly through inlet 13 does not directly impinge on the nozzle.

The spray nozzle 30 communicates through line 31 with a pump 32, the pump in turn communicating with a suitable container 33 for the liquid coating material. Since the nozzle, pumping means, and coating source are all conventional and are well known in the art, detailed description of those specific components is believed unnecessary herein.

In the operation of the apparatus, air under pressure passing through the plenum is formed to take an abrupt change in direction in order to flow upwardly through inlet 13 into the coating chamber. Specifically, the heated pressurized air flows downwardly and inwardly through the fursto-conical plenum until it is deflected by bottom wall 20*b* and inner wall or collar 29. It is believed that such abrupt change in direction, and the provision of plural entry ports 22, are particularly important in achieving an even uniform upward flow of air at inlet 13.

From inlet 13, the air under pressure travels upwardly as indicated by arrows 19 and as already described. Particles passing downwardly into the lower section 11*b* and then redirected by the upwardly flowing air are exposed to liquid coating materials sprayed upwardly from the nozzle as generally represented by broken arrows 34. The nozzle is adjusted axially so that its spray achieves a pattern of maximum area at the target area within the casing's lower section 11*b*, the "target area" being defined for purposes of this application as that area where the greatest number of particles change direction and begin moving upwardly through the central zone 16. The target area may be varied depending on the size and density of the particles, the velocity of the upwardly flowing air, and other factors. It is significant, however, that appropriate adjustments of nozzle 30 may be made during operation by viewing the target area and the spray pattern through transparent bottom wall 20*b* of casing 20.

Should an interchange of nozzles be desired, as where a second coating material having different viscosity and flow properties is to be applied, or when a nozzle is observed to be clogged, such interchange may take place without interrupting the flow of air and the circulation of particles through casing 11. The nozzle 30 is simply removed from its collar 20 and cleaned or a second nozzle of different orifice size, or having a different spray pattern, is substituted. Even when no nozzle is located in collar 29, there is no problem of particles falling downwardly through the collar, because the upwardly flowing air through orifice 13 prevents such particles from reaching the collar.

A further advantage of this design pertains to the unit's unloading features. It is not required to remove or reposition the coating chamber prior to discharging the coated particles. When the coating operation is completed the supply to the spray nozzle is interrupted, the supply of air is discontinued, and the coated particles are allowed to fall freely downwardly through inlet 13. Bottom wall 20b is then unlatched and opened to permit coated particles collected in the plenum and in the lower section 11b of the main casing to fall downwardly into a suitable receiving container (not shown).

The apparatus illustrated in FIG. 3 is identical to the structure depicted in FIGS. 1 and 2 except for the addition of a partition or inner shell 14 which sharply divides the zones of ascending and descending particles. The tubular partition or shell is open at opposite ends to define the inner passage or zone 16 for the upward migration of suspended particles. About the tubular partition is the annular zone or passage 17 which, in the illustration given, is of decreasing cross sectional area in a progressively downward direction. Such progressive narrowing of the outer passage has been found particularly effective in achieving smooth uniform flow characteristics, and freedom from clogging or jamming, especially in the coating of relatively small (40 to 16 mesh) particles. Where tablets or particles in larger size ranges are to be coated, effective results may be obtained utilizing a tubular partition of cylindrical configuration, rather than the frusto-conical configuration illustrated, so that the outer passage 17 is of substantially uniform cross sectional dimensions throughout its axial extent. As shown in FIG. 3, the tubular partition or inner shell 14 is suspended within the main section 11a of the casing by means of struts 15.

While in the foregoing we have disclosed embodiments of the invention in considerable detail for purposes of illustration, it will be understood by those skilled in the art that many of these details may be varied without departing from the spirit and scope of the invention.

We claim:

1. A particle coating apparatus having an upstanding first casing having a generally cylindrical upper section and a downwardly tapered frusto-conical lower section terminating in an air inlet, a nozzle for spraying a coating liquid upwardly into the lower section of said casing, means for supplying coating liquid under pressure to said nozzle, and means for directing air under pressure upwardly through said inlet about said nozzle to suspend and circulate particles in said casing for the coating of said particles as the same are so circulated, wherein the improvement comprises
    said inlet being open and unobstructed for the free downward flow of particles therethrough when the discharge of air and coating liquid into said casing is discontinued, said means for directing air including a second casing disposed below said first casing and joined to said first casing to define a chamber below said inlet, said second casing having a bottom wall spaced below said inlet for supporting particles falling into said chamber when the flow of pressurized air is discontinued and having a side wall with at least one air entry port above the level of said inlet for the passage of pressurized air through said chamber to the inlet of said first casing.

2. The apparatus of claim 1 in which said side wall is provided with a plurality of said air entry ports spaced circumferentially about said second casing above said inlet.

3. The apparatus of claim 1 in which said bottom wall comprises a closure for said chamber and is mounted for movement between open and closed positions.

4. The apparatus of claim 3 in which said bottom wall is hingedly mounted for movement between said open and closed positions.

5. The apparatus of claim 3 in which said bottom wall is formed of transparent material.

6. The apparatus of claim 1 in which said side wall of said second casing has a lower portion of generally frusto-conical shape spaced outwardly from the frusto-conical lower section of said first casing, said air entry portion being provided in an upper portion of said side wall a substantial distance above said inlet of said first casing.

7. The apparatus of claim 6 in which said upper portion of said side wall of said second casing is provided with a plurality of said air entry ports spaced circumferentially above said second casing.

8. The apparatus of claim 1 in which said nozzle extends upwardly through said bottom wall of said second casing and is coaxially disposed relative to said inlet.

9. The apparatus of claim 1 in which a partition is coaxially mounted in the upper section of said first casing, said partition being open at opposite ends to define an upward inner passage therethrough and an outer annular downward passage between said partition and the inner surface of said first casing's upper section, said nozzle being mounted in said chamber of said second casing for the spray discharge of coating liquid upwardly towards the open lower end of said partition.

10. The apparatus of claim 9 in which said partition is frusto-conical in configuration, said inner passage tapering upwardly and said outer annular passage being of downwardly decreasing cross sectional area.

11. A particle coating apparatus having an upstanding first casing having a generally cylindrical upper section and a downwardly tapered frusto-conical lower section terminating in an air inlet, a nozzle for spraying a coating liquid upwardly into the lower section of said casing, means for supplying coating liquid under pressure to said nozzle, and means for directing air under pressure upwardly through said inlet about said nozzle to suspend and circulate particles in said casing for the coating of said particles as the same are so circulated, wherein the improvement comprises
    said inlet being open and unobstructed for the free downward flow of particles therethrough when the discharge of air and coating liquid into said casing is discontinued, said means for directing air including a second casing disposed below said first casing and joined to said first casing to define a chamber below said inlet, said second casing having a bottom wall spaced below said inlet for supporting particles falling into said chamber when the flow of pressurized air is discontinued and having a side wall with at least one air entry port above the level of said inlet for the passage of pressurized air through said chamber and to the inlet of said first casing, said second casing also having a tubular inner wall mounted upon said bottom wall, said tubular inner wall being coaxial with said inlet and having an open upper end terminating adjacent said inlet, said tubular inner wall also having an outer diameter substantially smaller than said inlet and defining a vertical passage therethrough, said nozzle being mounted within said passage of said inner wall for the discharge of coating liquid from the open upper end of said passage through said inlet of said first casing.

12. The apparatus of claim 11 in which said nozzle is movably mounted within said inner wall for vertical adjustment within and removal from said passage.

13. The apparatus of claim 11 in which said side wall is provided with a plurality of said air entry ports spaced circumferentially about said second casing above the level of said inlet.

14. The apparatus of claim 11 in which said bottom wall comprises a closure for said chamber and is mounted for movement between open and closed positions.

15. The apparatus of claim 14 in which said bottom wall is removably connected to said side wall.

16. The apparatus of claim 14 in which said bottom wall is formed of transparent material.

17. The apparatus of claim 11 in which said side wall of said second casing has a lower portion of frusto-conical shape spaced outwardly from the frusto-conical lower section of said first casing, said air entry port being provided in an upper portion of said side wall a substantial distance above said inlet of said first casing.

18. The apparatus of claim 17 in which said upper portion of said side wall of said second casing is provided with a plurality of said air entry ports spaced circumferentially about said second casing.

19. The apparatus of claim 10 in which said tubular inner wall extends through and is movably mounted upon said bottom wall for vertical adjustment of said tubular inner wall within said chamber.

20. The apparatus of claim 19 in which said tubular inner wall is threadedly connected to said bottom wall.

21. The apparatus of claim 11 in which a partition is coaxially mounted in the upper section of said first casing, said partition being open at its opposite ends to define an upward inner passage therethrough and an outer annular downward passage between said partition and the inner surface of said first casing's upper section.

22. The apparatus of claim 21 in which said partition is frusto-conical in configuration, said inner passage tapering upwardly and said outer annular passage being of downwardly decreasing cross sectional area.

* * * * *